US006063126A

United States Patent [19]
Borduin

[11] Patent Number: 6,063,126
[45] Date of Patent: May 16, 2000

[54] MODELING SYSTEM HAVING CONSTRAINT SOLVERS

[75] Inventor: Scott M. Borduin, Lake Oswego, Oreg.

[73] Assignee: Autodesk, Inc., San Rafael, Calif.

[21] Appl. No.: 08/984,981

[22] Filed: Dec. 4, 1997

[51] Int. Cl.⁷ .................................................. G06F 17/10
[52] U.S. Cl. ...................... 703/2; 703/6; 703/7; 345/419; 706/919
[58] Field of Search .......................... 395/500.23, 500.28, 395/500.27; 345/428, 418, 419, 433, 964; 706/919

[56] References Cited

U.S. PATENT DOCUMENTS

| | | | |
|---|---|---|---|
| 4,901,221 | 2/1990 | Kodosky et al. | 364/200 |
| 5,251,290 | 10/1993 | Pabon | 345/418 |
| 5,297,057 | 3/1994 | Kramer et al. | 364/512 |
| 5,410,496 | 4/1995 | Bolon et al. | 395/500.28 |
| 5,452,238 | 9/1995 | Kramer et al. | 345/419 |
| 5,497,452 | 3/1996 | Shimizu et al. | 345/419 |
| 5,581,663 | 12/1996 | Zlotin et al. | 706/919 |
| 5,617,510 | 4/1997 | Keyrouz et al. | 706/45 |
| 5,732,192 | 3/1998 | Malin et al. | 395/10 |
| 5,777,621 | 7/1998 | Schneider et al. | 345/428 |

OTHER PUBLICATIONS

"Constraint Management in Conceptual Design" by David Serrano, Oct. 1987, Submitted to the Department of Mechanical Engineering at Massachusetts Institute of Technology.

Zalik, B.; Dewilde, P.; Vandewalle, J.; "Triggering Mechanism for Constraints Solving in Constraint–Based Geometric Modeling System", Proceedings CompEuro '92, Computer Systems and Software Engineering, pp. 544–549, May 1992.

Jae, Y. L.; Kwangsoo, K.;"Geometric Reasoning for Knowledge–based Pararmetric Design Using Graph Representation", Computer–aided Design, vol. 28, Issue 10, pp. 831–841, Oct. 1996.

Fudos, I.; Hoffmann, C.;"A Graph–constuctive Approach to Solving Systems of Geometric Constraints", ACM Transactions on Graphics, vol. 16, No. 2, pp. 179–216, Apr. 1997.

Anantha, R.; Kramer, G. A.; Crawford, R. H.; "Assembly Modelling by Geometric Constraint Satisfaction", Computer–aided Design, vol. 28, Issue 9, pp.707.722, Sep. 1996.

Gosselin, C.M.; Perreault, L.; Vaillancourt, C.; "Simulation and Computer–aided Design of Sherical Parallel Manipulators", Proceedings of OCEANS '93, vol. 2, pp. ll301–ll306, Oct. 1993.

Barton, R. R., "Design of Experiemnts for Fitting Subsystem Metamodels", Proceedings fo the 1997 Winter Simulation Conference, pp. 303–310, Dec. 7–10, 1997.

Fahndrich et al., "Partial Online Cycle Elimination in Inclusion Constraint Graphs", Proceedings of the ACM SIGPLAN '98 Conference on Programming Language Desing and Implementation, pp. 85–96, Jun. 1998.

Murray et al., "Issues and Answers in CAD Tool Interoperablility", Proceedings of the 33rd Annual Conf. on Design Automation, pp. 509, Jun. 1996.

*Primary Examiner*—Kevin J. Teska
*Assistant Examiner*—Douglas W. Sergent
*Attorney, Agent, or Firm*—Erik L. Oliver; Wilson, Sonsini, Goodrich & Rosati

[57] ABSTRACT

A model of a physical object is constructed in a modeling system running on a computer system. The model includes model objects and constraints. The constraints on the model describe the relationship between the model objects. The modeling system constructs a graph representing the model. The graph has nodes representing the modeling objects and arcs representing the relationships between the model objects. The relationships are either directed or nondirected. The modeling system then identifies the set of cycles in the graph. The cycles have a subset of the nodes of the graph coupled by arcs representing nondirected relationships. The modeling system starts with a first cycle from the set of cycles and determines the set of programs that can be used to satisfy all of the relationships between the model objects represented by nodes in the first cycle. Then, the modeling system selects one of the programs from the set of programs and uses it to define the model objects represented by the nodes in the cycle so that all of the constraints are satisfied.

23 Claims, 4 Drawing Sheets

MODELING SYSTEM HAVING CONSTRAINT SOLVERS

1. THE BACKGROUND OF THE INVENTION a. The Field of the Invention

This invention relates to the field of computer based modeling systems. In particular, the invention relates to the solution of constrained models.

b. Background Information

Computers can be used by people to model physical objects by using modeling applications. Allowing users to define models in terms of model objects and constraints is desirable. If a model object is constrained so that its location and dimensions are defined in relation to other model objects, it is easier for a user to model physical objects. Constraint satisfaction is the process of finding locations, dimensions, colors, speed, temperatures, etc., for model objects in accordance with the constraints specified in the model.

Models which are defined in terms of model objects and constraints are more easily modified by the user permitting greater design flexibility. The shortcoming of various approaches to providing constraint satisfaction has been the difficulty in handling different types of problems as well as difficulty handling large numbers of interdependent model objects. Previous approaches have provided a single monolithic constraint solver program. The monolithic solver program provided by previous approaches would be restricted to certain types of problems. Many physical objects have varied types of constraints. In the design of bridges for example, allowing the user to describe both structural and geometric constraints would simplify the modeling process. However, the ability to solve kinematic constraints would be more useful in the modeling of physical objects that move. It is difficult to provide high quality algorithms for handling all of these varied types of constraints in a single monolithic solver program. Therefore, what is desirable is to allow the modeling application to dynamically use solver programs from a number of sources. This permits the same modeling application to be used across a broader class of modeling problems than the monolithic solver program approach.

The weakness of previous modeling systems in handling large numbers of interdependent model objects grew out of the solution techniques used. Previous approaches apply iterative numeric approximations to the entire model. However it is desirable to allow the user to provide specific solver programs for various problem types, the best techniques for handling interdependent model objects can be used.

Research done at the Massachusetts Institute of Technology in 1987 identified strategies for satisfying constraints among a mix of problem types. See D. Serrano, *Constraint Management in Conceptual Design,* Ph.D. Thesis, Massachusetts Institute of Technology, October 1987. Serrano discusses, among other topics, the creation of directed graphs based upon a set of constraint definitions. To evaluate directed graphs with cycles, Serrano suggests collapsing the cycles into supernodes. However, Serrano's does not discuss graphs with directed and nondirected constraints. Directional constraints, also called unidirectional constraints, are constraints that cause a deterministic change to a set of output objects, given a predetermined set of "input" model objects. The cause and effect relationship is specific to the constraint's definition and is known without further context. An example is a boolean operation constraint such as a boolean intersection constraint of a box model object and a sphere object produces a new model object. The new model object will be deterministically changed by the input model objects and the boolean operation. Nondirectional constraints, also called bidirectional or multidirectional constraints, are those constraints which specify a condition which must be met, but do not inherently specify the cause/effect relationship without additional context. Typically, this additional context is supplied by other nondirected constraints during a simultaneous solution approach in a particular kind of solver program (described below). An example of a nondirected constraint is a parallel constraint between two line model. Additional context is required for the new model object to be completely determined. Instead, Serrano describes converting the entire graph into a directed graph, then collapsing cycles into supernodes. The graph is then evaluated to determine the missing values of the parameters in the constraints.

Another problem with the previous systems was that the entire model had to be reevaluated after changes. That made it difficult to provide on-the-fly constraint satisfaction. Therefore, it is desirable to have a system that can provide on-the-fly constraint satisfaction as the model is changed. Another problem of the previous systems was that no feedback was given on-the-fly if solver programs would be unable to satisfy constraints as they were input. Therefore, it is desirable to provide feedback to the user on-the-fly to indicate constraints which are unsolvable. Another problem with the previous systems was that the user could not specify criteria such as speed, accuracy, cost of use, etc., to control the selection of solver programs. Therefore, it is desirable to provide a mechanism for the user to control the selection of solver programs.

The previous approaches have never been combined to provide a broad efficient constraint satisfier for multiple problem types. Thus, there is a need for an improved method of constraint satisfaction in modeling systems.

SUMMARY OF THE INVENTION

A modeling system having constraint solvers is described.

One embodiment includes a model of a physical object is constructed in a modeling system running on a computer system. The model includes model objects and constraints. The constraints on the model describe the relationship between the model objects. The modeling system constructs a graph representing the model. The graph has nodes representing the modeling objects and arcs representing the relationships between the model objects. The relationships are either directed or nondirected. The modeling system then identifies the set of cycles in the graph. The cycles have a subset of the nodes of the graph coupled by arcs representing nondirected relationships. The modeling system starts with a first cycle from the set of cycles and determines the set of programs that can be used to satisfy all of the relationships between the model objects represented by nodes in the first cycle. Then, the modeling system selects one of the programs from the set of programs and uses it to define the model objects represented by the nodes in the cycle so that all of the constraints are satisfied.

In one embodiment a nondirected relationship between two model objects permits the identification of the second model object from the first object and the nondirected relationship.

In one embodiment, solver programs are provided to solve three dimensional geometric constraints, two dimensional geometric constraints, and kinematic constraints.

Although many details have been included in the description and the figures, the invention is defined by the scope of the claims. Only limitations found in those claims apply to the invention.

2. A BRIEF DESCRIPTION OF THE DRAWINGS

The figures illustrate the invention by way of example, and not limitation. Like references indicate similar elements.

3. THE DESCRIPTION a. An Overview of an Embodiment of the Invention

In one embodiment of the invention, a computer system is used to define a three dimensional model of an object. A user provides constraints between different components of the model.

b. System Overview

Figure 1:
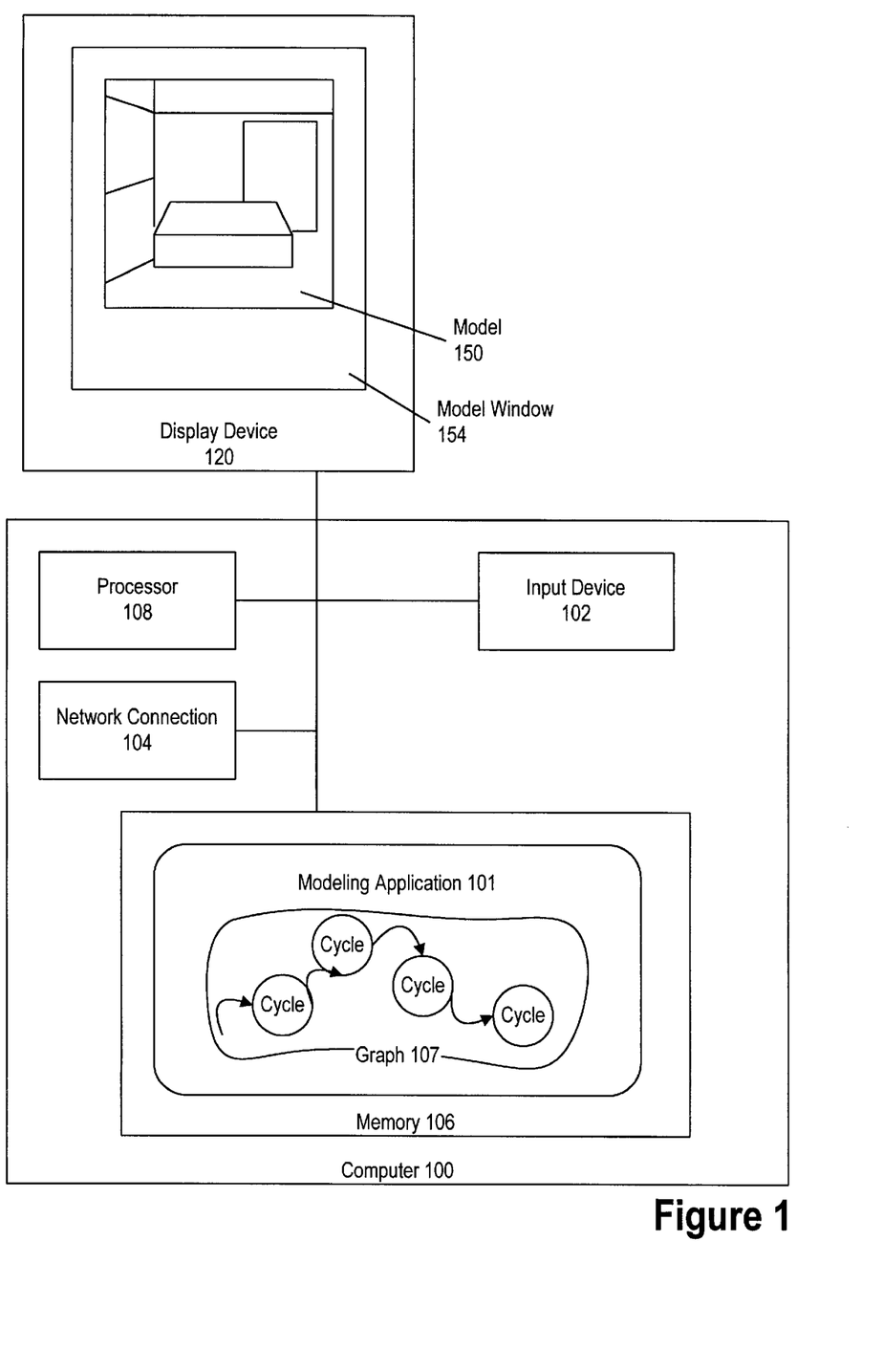
FIG. 1 illustrates a computer system including one embodiment of the invention.

FIG. 1 depicts a computer system containing an embodiment of the invention.

This paragraph lists the elements in FIG. 1. FIG. 1 includes a model 150 which is displayed in model window 154 on display device 120. The computer 100 includes a processor 108, an input device 102, a network connection 104, and a memory 106. The memory 106 includes a modeling application 101. The modeling application 101 stores a graph 107 in the memory 106.

This paragraph describes the interconnections between the elements in FIG. 1. Computer 100 is coupled to display device 120. Processor 108, input device 102, network connection 104 and memory 106 are coupled to a bus within computer 100.

Computer 100 may be a personal computer or a more powerful workstation computer. Computer 100 is controlled by processor 108. Processor 108 can be either a single processor or multiple processors coupled to memory 106. Input device 102 allows input to the computer 100. The input device 102 may be a mouse, other pointing device, and/or keyboard that allows a user to control the system and interact with the model 150. Display device 120 can be a CRT or other display device. Display device 120 is used to present a two dimensional representation of model 150 to the user. Model 150 is presented to the user inside a model window 154 on display device 120. Network connection 104 allows computer 100 to be connected to a network. Modeling application 101 can be stored in memory 106 or distributed across the network for access via network connection 104. In this example, modeling application is contained in memory 106. Modeling application 101 allows computer 100 to perform modeling. Graph 107 is stored in memory 106.

Processor 108 executes programs on computer 100 and displays results to the user on display device 120. Modeling application 101 can be executed on processor 108. Modeling application 101 permits the user to model physical objects such as buildings, machines, semiconductors, automobiles, planes, etc. In this example, model 150 shows a kitchen in the early stages of design. Modeling application 101 enables the user to define model 150. Model 150 is comprised of model objects and constraints. Constraints are relationships between model objects. For example, a constraint might be that two model objects must be parallel to one another.

Modeling application 101 permits the user to either completely define model objects or to partially define model objects. A completely defined model object has its location and dimensions fixed. For example, model 150 shows an island in the center of a kitchen. A counter top for the island could be completely defined by the user by using input device 102 to set the location and dimensions of the counter top.

A partially defined model object is defined in relation to other model objects by setting constraints. Partially defined objects may have their locations, dimensions, temperature, loads, speed, etc., partially defined by the user. For example, the user could use input device 102 to partially define the counter top for the island in model 150. The user would define the location and shape of the counter top in relation to the island model object. For example, the user could specify that the counter top was to be centered over the island, touching the top surface, and overlapping the island by 2" on each side. The user could then request that model 150 be solved. Once solved, the counter top model object would have its location and dimensions defined to satisfy the specified constraints.

The ability of modeling application 101 to use programs to solve the constraints between the model objects frees the user from having to completely define all of the objects in model 150. Another advantage of partially defined model objects is that it makes it easier for the user to alter model 150. For example, if the counter top model object is partially defined, then after the user moves the island, the modeling application 101 can be signaled to solve model 150 again.

The constraints in model 150 are either directional or nondirectional.

Modeling application 101 can have a number of programs, called solver programs, for solving constraints. The solver programs can either be part of modeling application 101 or separate computer readable program code.

Modeling application 101 can completely define the objects of model 150 by first representing the model objects as graph 107. Graph 107 in memory 106 is used by modeling application 101 to represent model 150. Graph 107 is comprised of nodes which represent the model objects and arcs which represent the constraints. Graph 107 may have cycles comprising modeling objects coupled solely by nondirectional constraints. The cycles of graph 107 are coupled with directional constraints. Cycles in graph 107 represent groups of partially defined model objects whose complete definition is dependent on the definition of the other objects.

For each cycle in graph 107, modeling application 101 then uses the available solver programs to completely define the model objects in the cycle. The resulting completely defined model objects can be used to compute the values of directed constraints leading to other cycles thus permitting all of the cycles in the graph to be solved.

In order to solve each cycle, modeling application 101 must select an appropriate solver program that is capable of solving all of the constraints in the cycle. If no solver program is available, an error will be reported to the user. Otherwise, modeling application 101 will completely define all of the modeling objects.

c. Satisfying the Constraints

Figure 2:
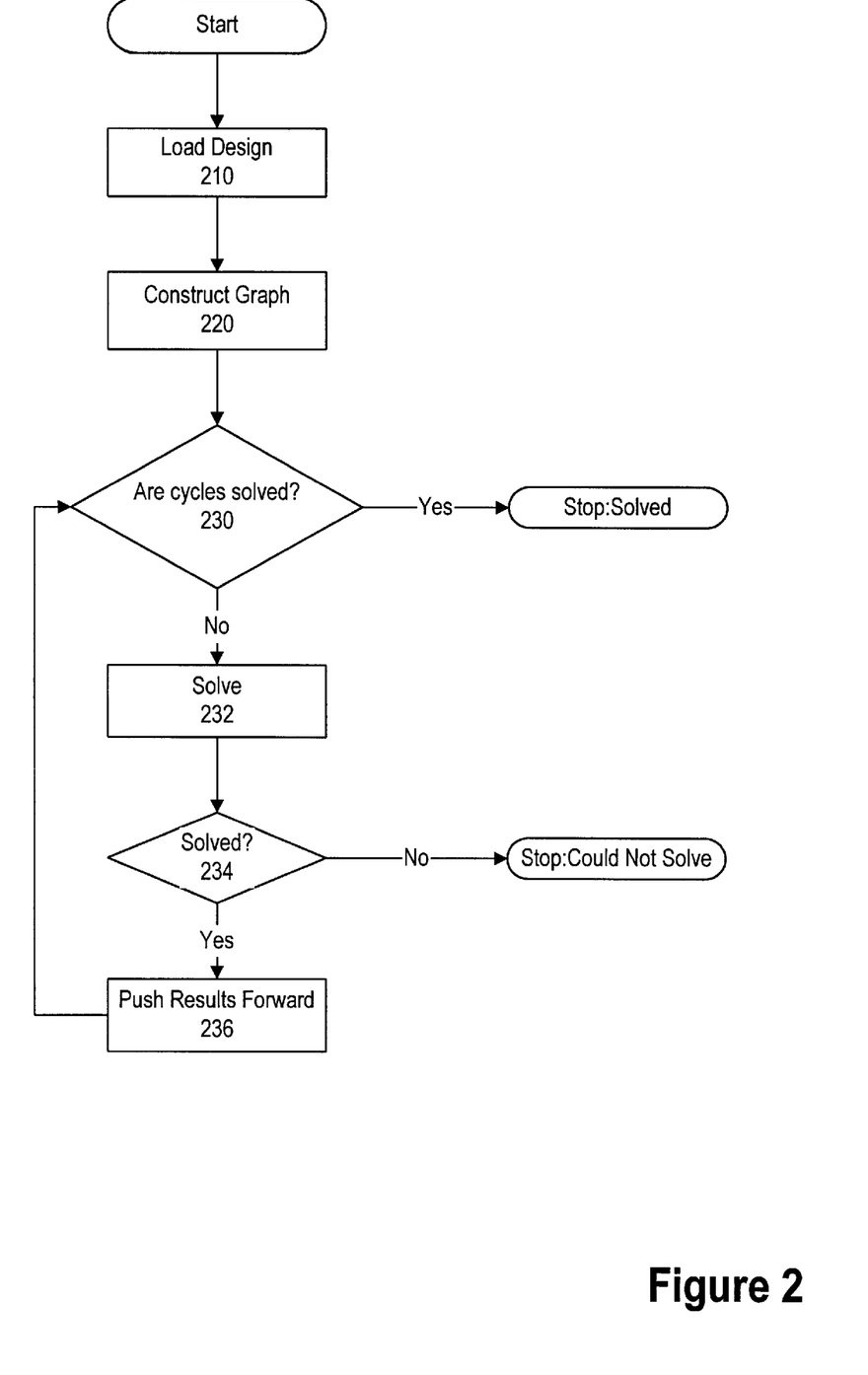
FIG. 2 illustrates one embodiment of a method of satisfying all of the constraints in a model.

FIG. 2 shows a flow chart of an embodiment of a method for satisfying the constraints between the model objects in model 150. FIG. 2 represents the steps taken by modeling application 101 to construct graph 107 representing model 150 and then to satisfy the constraints by working on the cycles of graph 107. The result of this method is to modify model 150 so that all of the model objects are completely defined and all of the specified constraints between the model objects are satisfied.

First, model 150 is loaded into memory 106 (block 210). Model 150 can be stored on disk, either locally or over the network, or may be defined by the user.

Modeling application 101 traverses the model objects in model 150 to construct graph 107 (block 220). During the traversal, modeling application 101 creates a node to represent each model object and creates an arc to represent each constraint. After creating graph 107, modeling application 101 determines the cycles in graph 107. The cycles include nodes coupled solely by nondirectional constraints. In this embodiment, modeling application 101 then roots graph 107.

Modeling application 101 can now traverse the cycles of graph 107 starting from the root (block 230, block 232, block 234, and block 236). After modeling application 101 traverses all of the cycles of graph 107, all of the model objects in model 150 will be completely defined (block 230). Until all of the cycles have been traversed, modeling application 101 tries to solve the next unsolved cycle (block 232). Modeling application 101 uses solver programs to try to completely define the model objects represented by the nodes of the current cycle.

A variety of solver programs are available. Some may be supplied with modeling application 101 and others are commercially available and can be purchased separately. Some example solver programs are DCM™, by D-Cubed, Ltd., GGCM™, by ALS Geometric Software, SA, and ADAMS™, by Mechanical Dynamics Inc. The example solver programs can be any type of solver such as two dimensional and three dimensional constraint solvers, mechanism constraint solvers, fluid flow solvers, heat transfer solvers, and electromagnetic interference solvers.

If modeling application 101 can not solve a cycle, the user is notified that the model can not be completely defined (block 234).

Before modeling application 101 traverses the next unsolved cycle, modeling application 101 tries to solve all of the directed relationships in graph 107 which are coupled to the current cycle (block 236). Modeling application 101 uses solver programs to completely define those directed relationships.

Modeling application 101 then continues traversing the cycles of graph 107 at block 230 until a solution is found.

d. Solver Selection

Figure 3:
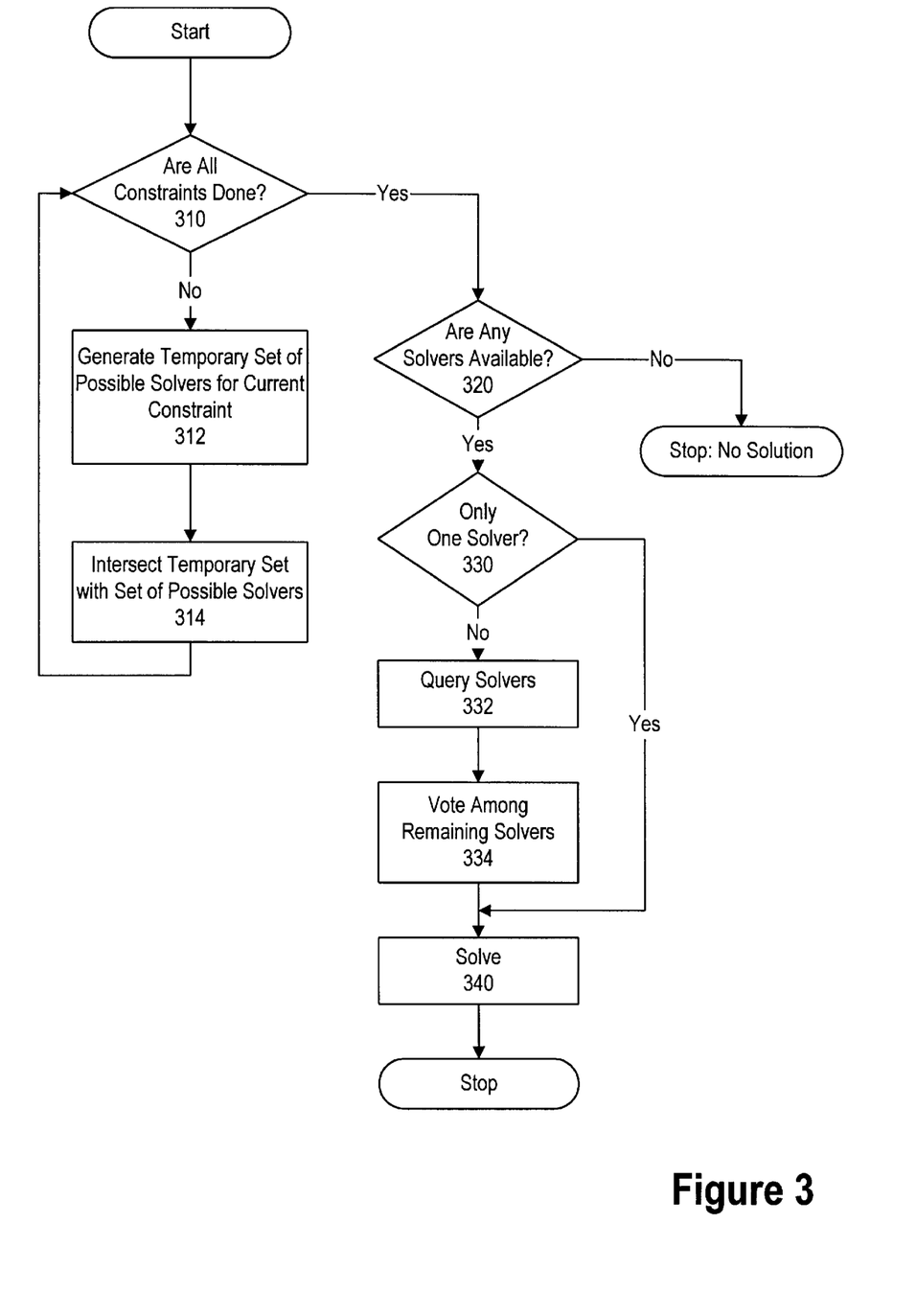
FIG. 3 illustrates one embodiment of a method of selecting programs to satisfy the constraints in a group of nodes.

FIG. 3 shows a flow chart of an embodiment of a method of dynamically selecting a solver capable of solving all of the constraints specified in a cycle of graph 107. In an embodiment of the invention these blocks can be used at block 232 to efficiently identify the programs available to completely define the objects in a cycle.

The first step is to examine all of the nondirectional constraints represented by the arcs in the given cycle (block 310). If all constraints have been examined, control proceeds in block 320.

Otherwise, at block 312, a constraint is examined and a set of solver programs is generated that can be used to solve that constraint. Each constraint in modeling application 101 belongs to a class. Each class has associated with it a list of possible solver programs that can solve constraints of that class. In block 312, the list of those solver programs along with the solver programs for the superclasses of the given class are collected into a temporary set. One embodiment of the invention uses the factory-solver, sometimes called flexible object creation, technique as described in "Design Patterns for Object-oriented Software Development," by Wolfgang Pree, Addison-Wesley 1995, pp. 115–117, as the basis for implementing the class hierarchy of solver programs and allowing dynamic selection and use of solver programs.

The first time through block 314, the set of all currently available solver programs is built and held as the list of possible solver programs. The temporary set of solver programs generated in block 312 is intersected with the possible solver programs each time (block 314). This intersection technique keeps a running list of all of the possible solver programs that can solve all of the examined constraints in the given cycle.

Once all of the constraints have been examined, if no solver programs are available, the process stops and signals that no solver is available (block 320).

If only one program is capable of satisfying the constraints in the cycle, control proceeds in block 340 (block 330).

When multiple solver programs are in the set of possible solver programs, a query-vote technique is used to select the best solver program (block 332 and block 334). First, the solver programs are queried (block 332). The query process involves providing each solver program with the model objects represented by the given cycle and verifying that the solver is able to handle this group of model objects and constraints. After the query, a vote is taken among the remaining constraints to select the best solver to use (block 334). The vote can be based on user determined factors such as: speed, accuracy, and cost. For example, during the initial stages of constructing a model, the user might prefer rapid constraint satisfaction and signal that the fastest solver programs be selected. In contrast, a user modeling a precision part might signal that the most accurate solver programs be used.

Lastly, the selected solver is used (block 340). The result of using the solver on the model is to modify the objects in the current cycle of graph 107 so that those model objects are completely defined and the constraints between the objects are satisfied.

e. Example of Constraint Satisfaction

Figure 4:
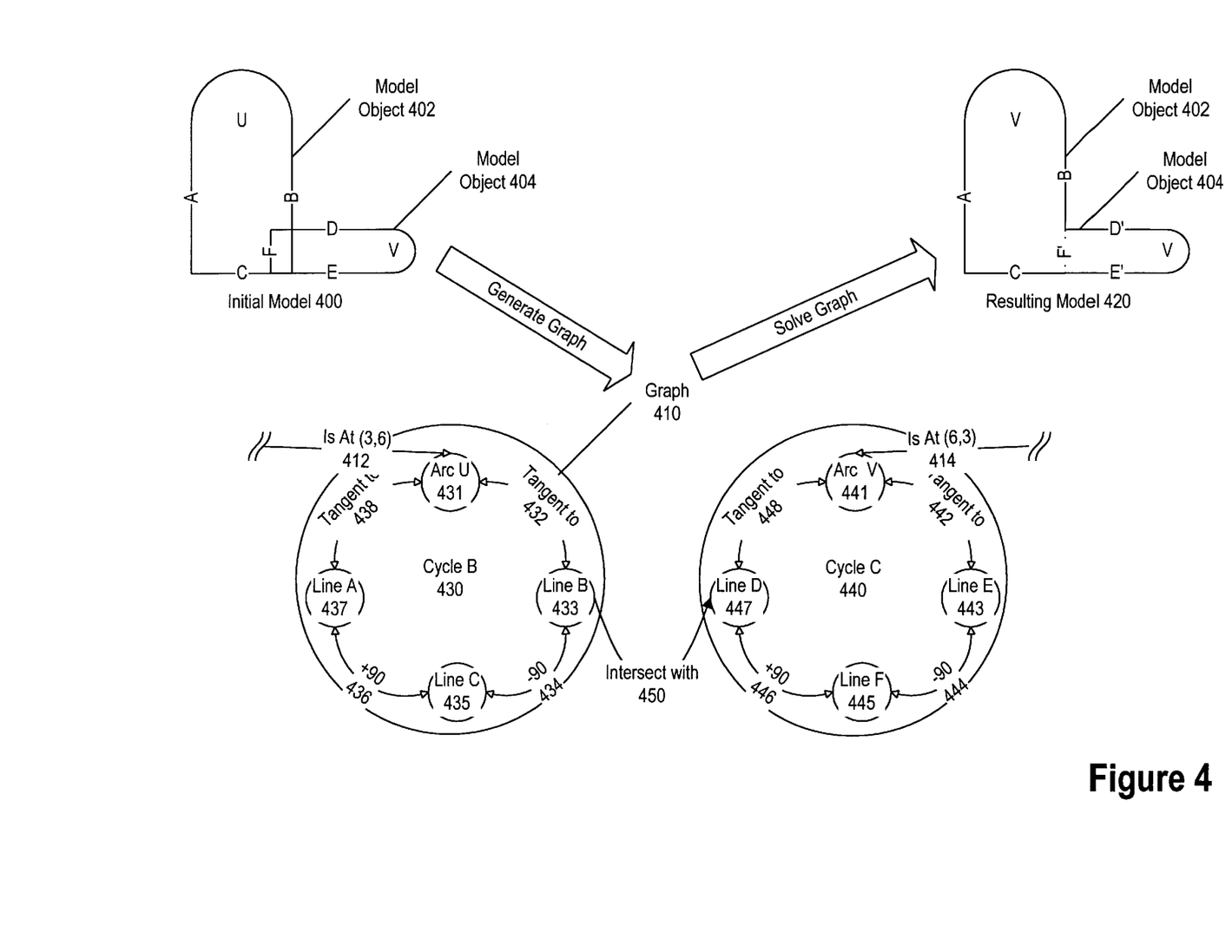
FIG. 4 illustrates an example of the constraint satisfaction process.

FIG. 4 shows an example of constraint satisfaction using an embodiment of the invention. The embodiments of FIGS. 2 and 3 are used together running on the computer system 100 described in FIG. 1. In FIG. 4, the user will be designing a counter top for the kitchen depicted in model 150. Rather than painstakingly setting all of the positions of the model objects representing the counter top, the user has elected to define some of the model objects partially. The counter top designed by the user in this fashion can then easily be placed into other models such as model 150 of the kitchen. Further, after making any changes, the user will always be able to signal that the model should be solved again to ensure that the constraints defining the counter top model objects are preserved.

This paragraph lists the elements of FIG. 4. An initial model 400 and the resulting model 420 are shown. An object 402 and an object 404 are in the initial model 400. Object 402 and object 404 are in the resulting model 420. Graph 410 of initial model 400 is shown. Graph 410 includes: constraints "is at (3,6)" 412, "is at (6,3)" 414, "tangent to" 432, "−90°" 434, "+90°" 436, "tangent to" 438, "tangent to" 442, "−90°" 444, "+90°" 446, "tangent to" 448, "intersect with" 450; and model objects: arc U 431, line B 433, line C 435, line A 437, arc V 441, line E 443, line F 445, line D 447. The cycles of graph 410 are cycle B 430 and cycle C 440. Cycle B 430 includes line A 437, line B 433, line C 435, arc U 431, "tangent to" 432, "−90°" 434, "+90°" 436, and "tangent to" 438. Cycle C 440 includes line D 447, line E 443, line F 445, arc V 441, "tangent to" 442", "−90°" 444, "+90°" 446, and "tangent to" 448.

This paragraph lists the connections between the elements of FIG. 4. Arc U 431 is coupled to line B 433 by"tangent to" 432. Line B 433 is coupled to line C 435 by "−90°" 434.

Line C 435 is coupled to line A 437 by "+90°" 436. Line A is coupled to arc U 431 by "tangent to" 438. Line B 433 is coupled to line D 447 by "intersect with" 450. Line D 447 is coupled to arc V 441 by "tangent to" 448. Arc V is coupled to line E 443 by "tangent to" 442. Line E 443 is coupled to line F 445 by "-90°" 444. Line F 445 is coupled to line D 447 by "+90°" 446. "Is at (3,6)" 412 is coupled to arc U 431. "Is at (6,3)" 414 is coupled to arc V 441.

Upon receiving a signal, modeling application 101 attempts to completely define initial model 400. Using the embodiment described in FIGS. 2 and 3, the model is loaded into memory 106. Then graph 410 representing initial model 400 is constructed. Model object 402 and model object 404 are composed of simpler model objects which were only partially defined. Graph 410 reflects the relations between all of the objects in initial model 400.

After constructing graph 410, modeling application 101 identifies the cycles of graph 410. The cycles in graph 410 are cycle B 430 and cycle C 440. Following the method described in FIG. 2, we can solve each cycle independently.

Starting with cycle C 440, the embodiment of FIG. 3 is used to identify the solver programs for the constraints in the cycle. Modeling application 101 identifies the set of all available solver programs. Modeling application 101 might include: a 3-dimensional geometric constraint solver, a 2-dimensional geometric constraint solver which is a subclass of the 3-dimensional geometric constraint solver, an inverse kinematic constraint solver, an angular constraint solver which is a subclass of the 2-dimensional geometric constraint solver, and a "tangent to" constraint solver which is a subclass of the 2-dimensional geometric constraint solver. The solver programs available to modeling application 101 can be supplemented by user supplied programs. In this example, there are no user supplied solver programs.

By examining each of the constraints of cycle C 440 in turn, the list of possible solver programs will be narrowed. After examining the "-90°" 444 constraint, the set of possible solver programs would be reduced to the 3-dimensional geometric constraint solver, the 2-dimensional geometric constraint solver, and the angular constraint solver. After examining the "tangent to" 442 constraint, the set of possible solver programs would be reduced to the 3-dimensional geometric constraint solver and the 2-dimensional geometric constraint solver. Examining the remaining constraints of cycle C 440, does not reduce the set of possible solver programs further.

Since two solver programs are available, the solver programs must be queried with the objects and constraints of cycle C 440. It is possible that certain solver programs might have a limit on the number of objects or constraints they can handle, for example, modeling application 101 might have two 2-dimensional geometric constraint solver programs. One of the solver programs might use a numeric approximation technique and be limited to working on ten model objects or fewer while the other might use algebraic computation and handle an unlimited number of objects. During the query, if cycle C 440 contained more objects than one of the available solver programs could handle, that solver would be removed from the set of possible solver programs.

In this example, neither solver drops out during the query process and a vote is taken. Modeling application 101 can take into account user signals such as preferring speed over accuracy as well as the preferences of the constraints for one solver over another. In this case, the user has signaled that accuracy is more important. The constraints vote and the 2-dimensional geometric constraint solver is selected. Arc V 441 in cycle 440 was positioned by an earlier cycle which was coupled to arc V 441 by the "is at (6,3)" constraint which centered the arc. The model objects of cycle C 440 are completely defined by running the solver program.

Modeling application 101 next tries to solve the directed constraints coupled to cycle C 440. Since line B 433 coupled to directed constraint "intersect with" 450 is still partially defined, no change is made to the model.

Modeling application 101 repeats this process on cycle B 430 and completely defines the model objects of that cycle.

Upon solving cycle B 430, the directed constraints coupled to cycle B 430 can be solved. Once the "intersect with" 450 constraint is solver, the graph has been fully solved, and all constraints between the objects are satisfied. Resulting model 420 is shown.

What is claimed is:

1. A method of defining a model using a computer system comprising:

identifying said model, said model including a set of model objects and a set of relationships between said set of model objects, and wherein some of said set of model objects are partially undefined;

generating a graph of said model, said graph defining which relationships of said set of relationships are directed and which relationships of said set of relationships are nondirected, said graph also defining a set of cycles, at least a first cycle defining a subset of model objects of said set of model objects, said first cycle having nondirected relationships between model objects of said subset;

for at least said first cycle, determining a set of programs that can completely define said model objects of said subset;

selecting a first program from said set of programs; and using said first program to completely define said model objects in said subset.

2. The method of claim 1 wherein generating said graph includes:

defining a set of nodes, each node being a model object in said model;

defining a set of arcs from said set of relationships, each arc being a relationship between at least two model objects in said model;

determining a type of each relationship, each relationship being one of a directed relationship and a nondirected relationship; and generating said set of cycles by forming groups of nodes from said set of nodes, for each group of nodes, nodes within the group of nodes are coupled by arcs corresponding to nondirected relationship, and wherein groups of nodes are coupled by arcs corresponding to directed relationships.

3. The method of claim 1 wherein said directed relationship has a deterministic change on a set of output models given a set of input models.

4. The method of claim 1 wherein said nondirected relationship has a nondeterministic change on a set of output models given a set of input models, said nondirected relationship requiring additional context information to determine the change to said set of output models.

5. The method of claim 1 wherein said determining said set of programs includes:

for each nondirected relationship in said first cycle, generating a set of possible programs that can solve said each nondirected relationship; and generating said set of programs by intersecting all of said sets of possible programs.

6. The method of claim 5 wherein said first cycle includes a first nondirected relationship, wherein said computer system includes a class hierarchy, said class hierarchy includes a first class and a first superclass, said first superclass being a superclass of said first class, wherein said first nondirected relationship is an instance of said first class, and said first class being associated with a first set of solver programs capable of solving an instance of said first class, said first superclass being associated with a second set of solver programs capable of solving an instance of said superclass, and wherein said generating said set of possible programs includes adding said first set of solver programs and said second set of solver programs to said set of possible programs.

7. The method of claim 1 wherein said graph includes a first model object and a second model object and said graph includes a second cycle and a first directed relationship, said first model object being in said first cycle, said second model object being in said second cycle, and said method further comprising using the completely defined model objects in the first cycle, to completely define the second model object in the second cycle.

8. The method of claim 1 wherein said selecting said first program includes:

for each program in said set of programs determining whether said each program can completely define said model objects in said first cycle; and adding those programs that can completely define said model objects in said first cycle to a second set of programs, wherein said second set of programs includes said first program.

9. The method of claim 8 further comprising selecting said first program from said second set of programs if said second set of programs only includes said first program.

10. The method of claim 8 wherein said second set of programs includes a plurality of programs, said method further comprising selecting said first program from said second set of programs based upon a predetermined criteria.

11. The method of claim 10 wherein said predetermined criteria indicate said first program will completely define said set of model objects faster than other programs in said plurality of programs.

12. The method of claim 10 wherein said predetermined criteria indicate said first program will completely define said set of model objects less expensively than other programs in said plurality of programs.

13. The method of claim 10 wherein said predetermined criteria indicate said first program will completely define said set of model objects less with greater accuracy than other programs in said plurality of programs.

14. The method of claim 10 wherein said predetermined criteria indicates said first program best fits a set of predetermined priorities for selecting a program from said plurality of programs.

15. The method of claim 1 wherein said set of programs includes a three dimensional constraint solver program.

16. The method of claim 1 wherein said set of programs includes a kinematic solver program.

17. A system for generating a three dimensional model, said system comprising:

a processor for executing instructions and accessing data;

a memory for storing said instructions and said data, said memory comprising a model including a set of model objects and a set of relationships between said set of model objects and wherein some of said set of model objects are partially undefined; and wherein said instructions include a first set of instructions for constructing a graph of the model in said memory, a second set of instructions for identifying at least a first cycle in said graph, said cycle defining a subset of model objects of said set of model objects, said first cycle having nondirected relationships between model objects of said subset, a third set of instructions for determining a set of programs that can completely define said model objects of said subset, a fourth set of instructions for selecting a first program from said set of programs, and a fifth set of instructions for using said first program to completely define said model objects in said subset.

18. The system of claim 17 wherein said third set of instructions includes:

a sixth set of instructions for generating a set of possible programs that can completely define each nondirected relationship of said first cycle; and a seventh set of instructions for identifying a subset of said set of possible programs.

19. The system of claim 17 wherein said fourth set of instructions includes:

a sixth set of instructions for verifying that each program of said set of programs can completely define said first cycle;

a seventh set of instructions for each nondirected relationship of said first cycle to select a preferred program; and an eighth set of instructions for choosing as said first program the preferred program selected by the most nondirected relationships.

20. The system of claim 17 wherein said using said set of programs includes an inverse kinematic solver program.

21. A computer program product comprising:

a computer usable medium having a computer readable program code embodied therein for causing a computer to create an N dimensional model, where N>1, based on physical objects comprising a set of model objects and a set of relationships between said model objects, and wherein some of said set of model objects are partially undefined, the computer readable program code comprising, computer readable program code that identifies said set of model objects;

computer readable program code that identifies said set of relationships between said model objects computer readable program code that generates a graph representing said set of model objects and said set of relationship between said model objects;

computer readable program code that identifies cycles in said graph, said cycles having a subset of model objects of said set of model objects, said cycles having nondirected relationships between model objects of said subset;

computer readable program code that identifies a set of programs capable of completely defining the model objects of each cycle; and computer readable program code that completely defines the model objects in a cycle by using one of said set of programs capable of completely defining the model objects of said cycle.

22. The computer program product of claim 21, wherein code that identifies a set of programs capable of completely defining the model objects of each cycle comprises:

code that identifies the set of programs capable of solving each relationship between the model objects of said cycle; and code that identifies a subset of said sets of programs.

23. The computer program product of claim 21, wherein code that completely defines the model objects in a cycle by using one of said set of programs comprises:

code that identifies the quickest program from said set of programs; and code that calls said quickest program to completely define the model objects of said cycle.

\* \* \* \* \*